United States Patent
Grimaud et al.

(10) Patent No.: US 7,913,265 B2
(45) Date of Patent: Mar. 22, 2011

(54) METHOD OF LOADING SOFTWARE WITH AN INTERMEDIATE OBJECT ORIENTED LANGUAGE IN A PORTABLE DEVICE

(75) Inventors: Gilles Grimaud, Lille (FR); Jean-Jacques Vandewalle, Lille-Hellemmes (FR)

(73) Assignee: Gemalto SA, Cedex (FR)

( * ) Notice: Subject to any disclaimer, the term of this patent is extended or adjusted under 35 U.S.C. 154(b) by 814 days.

(21) Appl. No.: 11/629,518

(22) PCT Filed: Jun. 7, 2005

(86) PCT No.: PCT/EP2005/052621
§ 371 (c)(1), (2), (4) Date: Jun. 19, 2007

(87) PCT Pub. No.: WO2005/124544
PCT Pub. Date: Dec. 29, 2005

(65) Prior Publication Data
US 2008/0010649 A1    Jan. 10, 2008

(30) Foreign Application Priority Data
Jun. 15, 2004  (FR) .................................... 04 06493

(51) Int. Cl.
*G06F 13/00* (2006.01)
(52) U.S. Cl. ............ 719/331; 719/332; 718/1; 717/148; 717/166
(58) Field of Classification Search .................. 719/331, 719/332; 718/1; 717/148, 166
See application file for complete search history.

(56) References Cited

U.S. PATENT DOCUMENTS

| 6,349,344 | B1 | 2/2002 | Sauntry et al. |
| 6,718,546 | B1 * | 4/2004 | Johnson ........................ 717/169 |
| 7,665,075 | B1 * | 2/2010 | Daynes et al. ................ 717/148 |
| 2003/0005020 | A1 | 1/2003 | Wallman et al. |
| 2003/0028686 | A1 | 2/2003 | Schwabe et al. |

(Continued)

FOREIGN PATENT DOCUMENTS

CN    1321281    11/2001

(Continued)

OTHER PUBLICATIONS

Tim Lindholm et al., "The Java™ Virtual Machine Specification, The Java Series From the Source", The Java™ Virtual Machine Specification, Reading, MA, Addison-Wesley, US, 1997, pp. 40-55, 139-149, 151-152, and 389-390.

(Continued)

*Primary Examiner* — Andy Ho
(74) *Attorney, Agent, or Firm* — Buchanan Ingersoll & Rooney PC

(57) ABSTRACT

The invention relates to a method for loading a software having several modules loadable in the non-volatile memory of a portable digital device. The loading of at least one module includes testing the existence of a data structure associated with the module in the non-volatile memory and, when necessary, to create the data structure indicating it as empty. The method further includes resolving links for totality of internal elements and, afterwards, in marking the structure as loaded. The existence of an associated data structure is determined for each other module referenced in the loadable module and, when necessary, the structure is created and indicated as empty. The invention makes it possible to reduce the space occupied by the on-board software during loading of modules.

18 Claims, 2 Drawing Sheets

U.S. PATENT DOCUMENTS

2004/0015935 A1 1/2004 Sokolov et al.

FOREIGN PATENT DOCUMENTS

| EP | 1 416 378 A2 | 5/2004 |
|---|---|---|
| JP | 2000-029706 | 1/2000 |
| JP | 2001-256058 | 9/2001 |
| JP | 2001-518658 | 10/2001 |
| JP | 2002-508560 | 3/2002 |
| JP | 2003-509761 | 3/2003 |
| WO | WO 99/17191 | 4/1999 |
| WO | WO 99/31576 | 6/1999 |
| WO | 00/46666 A2 | 8/2000 |

OTHER PUBLICATIONS

International Search Report dated Dec. 28, 2005 (with English translation of category of cited documents).

French Search Report dated Mar. 18, 2005 (with English translation of category of cited documents).

First Office Action dated Feb. 15, 2008 in a corresponding Chinese patent application and English-language translation, 10 pages.

Notice of Reasons for Rejection dated Apr. 13, 2010 in a corresponding foreign patent application, 5 pages.

* cited by examiner

METHOD OF LOADING SOFTWARE WITH AN INTERMEDIATE OBJECT ORIENTED LANGUAGE IN A PORTABLE DEVICE

The present invention relates to the software and execution environments embedded in a portable device and, in particular, the methods of loading such software in a portable device.

Intermediate object oriented programming languages have been developed. The main aim of these languages is to render their programs independent from the hardware on which they must be executed. Thus, programmers are generally freed from the constraints linked to specific hardware. The distribution of the same version of a program for different hardware is also possible. Intermediate object oriented languages such as Java pseudocode (named after the bytecode) obtained by compiling Java source language have therefore seen a consequent increase in popularity.

A Java program for a desktop computer is usually distributed in the form of a set of modules made up of .class files. These files correspond to a compiled form of the software. Each compiled file corresponds to a class data structure and, as such, comprises the information in this class: namely, the description of the class elements (its constants, fields, methods), the description of the elements used by the class and defined in other classes (fields and methods), the code for the class methods in the form of instructions (pseudocode) which can be interpreted by the Java Virtual Machine interpreter. In a .class file, the descriptions of the class elements and the elements used by the class are grouped together in a reference table (constant pool) which mainly associates numerical symbols (the entry number in the constant pool) with element descriptions. Thus, among the interpretable instructions (pseudocode) the references to class elements and elements used by the class are "referenced" by their entry number in the table of references (constant pool). A .class file may have, for example, the following structure:

```
ClassFile {
    Id_info;          //Version number
    Constant_pool;    //Stores all the references to class
    elements and elements used by the class
    Base_info;        //Access flag, name of class and
    superclass
    Interface_list;   //Interfaces implemented by the
    class
    Field_list;       //Description of the class fields
    Method_list;      //Methods in this class (including
    their pseudocode, which is to say the instructions that
    can be interpreted by the interpreter of the virtual
    machine)
    Atrribute_list    //Attributes (for example: debugging
    information, etc.)
}
```

The compiled program files are stored on a mass memory device on the computer, for example a hard disk. The Java software is executed by the Java Virtual Machine installed on the computer. This virtual machine loads and transforms the ClassFile information into data structures in working memory which are specific to the virtual machine and which allow this virtual machine to execute the program.

This loading (and transformation) stage of Java software can be carried out on the majority of desktop computers with considerable random access memory (RAM) and processor resources. These resources allow them effectively to load the program by creating, on the fly and in RAM, the internal data structures of the virtual machine which then allow the programme to be executed in RAM. This loading stage preceding execution mainly involves a link-editing stage in which the references to internal and external elements of the class in the created data structures are replaced with memory addresses of thus created data structures.

However, certain systems that must run Java software have much more limited capacity, which prevents this type of execution. Therefore, due to the constraints of miniaturisation, a chip card typically comprises between 1 and 4 kilobytes of RAM (used as working memory), between 32 and 64 kilobytes of rewritable non-volatile memory (used as mass memory and working memory) and around 256 kilobytes of read-only memory (used for storing the execution environment code). Such a chip card is therefore unsuited to this type of functioning which would involve storing the .class file in non-volatile memory and carrying out this stage of loading in volatile memory for each execution. Furthermore, the class data on the card would thus be duplicated: the data in the .class file in non-volatile memory and the data in data structure form in volatile memory.

A first solution consists of storing the data structures defined by the specifications of the virtual machine on the chip card directly in the non-volatile memory of the chip card. In this way, the virtual machine on the card no longer has to carry out the loading operation, since it receives the class data in data structure format, therefore ready to be executed.

Document US2003/028686 describes such a loading technique. The .class files are thus converted to .cap files in the Java Card (registered trademark) format on a loading machine, this file then being loaded onto the chip card either during the manufacturing process or later during its usage. The .cap file comprises, in particular, a header, a reference table, a method descriptor and an external element descriptor. The loading machine also generates a file called ExportFile, associated with the generated .cap file. This ExportFile file makes it possible for public elements to be declared within the .cap file, for example so that other separate applications may use its elements.

However, the use of this solution has its disadvantages. Java Card has a reduced set of instructions compared to Java. In particular, Java Card does not support dynamic class loading. Dynamic link editing is limited after the .cap file has been loaded onto the chip card. It is not easy to generate the loaded .cap files from .class files which use instructions not supported by Java Card. Furthermore, the conversion stage complicates the programmers' task as a specific conversion must be provided for each chip card type (in relation to the programs already loaded onto the card and for which the corresponding ExportFiles must be present during conversion). The program must also be loaded onto the chip card in one go. Any interruption in the transmission will involve restarting the load process from the beginning. Finally, two other disadvantages of this solution are the use of a class distribution file format which is specific to the card (.cap) and the necessary standardisation of the internal data structures of the virtual machine, which are described in the new .cap file thus defined.

A second solution involves compiling the .class files into the chip card's native language when they are being installed. The working memory of the chip card is no longer taken up with a virtual machine and the execution time is noticeably reduced. The loading and link-editing process is consequently carried out. The native code generated in this way has disadvantages as it takes up a much greater amount of memory than interpreted code. Furthermore, compilation is complex and costly as it must be specific to the chip card.

Also, the security of the chip card is weakened, since the program compiled into native machine code can provide data on the workings of the card.

The invention aims to solve one or more of these disadvantages. The objective of the invention is thus to provide a method of loading software compiled into intermediate object oriented language and comprising several modules for loading into the non-volatile memory of a portable digital device equipped with a virtual execution machine, these modules needing to be loaded in a form that can be executed by the interpreter of said virtual machine, the loading of at least one of these modules comprising the following steps:

checking for the existence of a data structure associated with this module in the non-volatile memory; and if this data structure does not exist, creating a data structure associated with this module in the non-volatile memory and marking this data structure as not loaded;

resolving the links for all the internal elements of this module in this data structure then marking this data structure as loaded;

for every other module referenced in the module being loaded, checking for the existence of a data structure associated with this other module;

if there is no data structure associated with this other module, creating a data structure associated with this other module in the non-volatile memory and marking this data structure as not loaded.

According to an alternative embodiment of the invention, the step of creating the data structure associated with the module to be loaded comprises the storage in this data structure of a descriptor of the module to be loaded contained within this module to be loaded.

According to another alternative embodiment of the invention, the link resolution step comprises:

verifying the existence of a data structure associated with each internal element;

if this data structure does not exist, creating a data structure associated with this internal element in the non-volatile memory;

for each external element mentioned in the module being loaded:

verifying the existence of a data structure associated with this external element;

if this data structure does not exist, creating a data structure associated with this external element in the non-volatile memory;

According to another alternative embodiment of the invention, the loading of said module also comprises, after the link resolution, the marking of this module as linked if all external modules it mentions are marked as loaded.

A check for the existence of a data structure can comprise a conformity test between this data structure, if it exists, and its reference in the module being loaded and the storage of conformity check information; the conformity check information of the references is deleted when the module is marked as linked.

Such a method can comprise the following steps:

initialising the static data of the module marked as linked;

marking this module as ready for use.

Code stored in the digital device and intended to initialise static data can then be deleted once the module is marked as ready for use.

According to an alternative embodiment of the invention, the modules to be loaded are compiled Java .class files. The data structures are data structures that can be handled by the virtual machine. The digital device is a chip card with an embedded Java or DotNet virtual machine.

It is possible to provide for such module loading to be carried out for all the program modules.

Following the unavailability of a module, the availability of this module can be checked so that the module can be automatically loaded by the portable device.

The invention also relates to a loader for a program compiled into an intermediate object oriented language comprising several modules to be loaded in the portable digital device, this loader being capable of being stored in the non-volatile memory of the device, of accessing modules stored on a source device and of implementing the method outlined above.

The invention also relates to a program loaded in a portable device according to such a method.

The invention furthermore relates to a portable digital device comprising non-volatile memory that stores the aforementioned loader. According to an alternative embodiment, the non-volatile memory stores the aforementioned program.

According to another alternative embodiment of the invention, this device is a chip card.

Other special features and advantages of the invention will become apparent from reading the description provided as an example in a non-limiting fashion and relating to the appended drawings, in which.

Portable electronic device will be used henceforth to refer to a portable device such as a portable computer but also to any other electronic device equipped with a microprocessor comprising a processor and memory devices.

The invention proposes loading the program modules onto a portable device by creating a data structure for the elements mentioned for the first time during loading. In this way, a data structure intended to be executed by the virtual machine of the portable device is created directly by the external elements of the module during loading, without storing a temporary representation thereof. The elements which are not needed for execution are deleted from the non-volatile memory of the non-portable device as the loading, link-editing and optimisation steps are performed by a program module loader.

Figure 1:
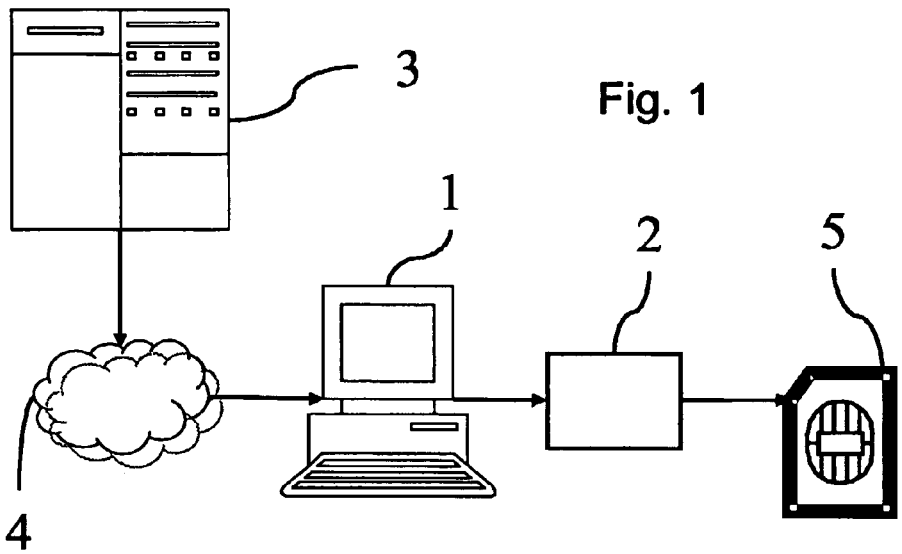
FIG. 1 shows an example of the implemented computer system for loading onto a chip card.

FIG. 1 shows an example of the means implemented for loading a compiled program onto a chip card 5, which in this instance constitutes the portable device. A computer 1 is equipped with a chip card reader 2, into which the chip card 5 is inserted. The computer 1 is for example connected to a server 3 by means of a computer network 4. Compiled program modules are hosted on the server 3 (for example in the form of a set of .class files for a program compiled in Java). The chip card 5 is equipped with a virtual machine for executing the loaded programs.

The following is a detailed description of the invention in the particular context of a program compiled in Java, although the invention can also be applied to programs compiled into other intermediate object oriented languages, such as .NET (registered trademark).

Figure 2:
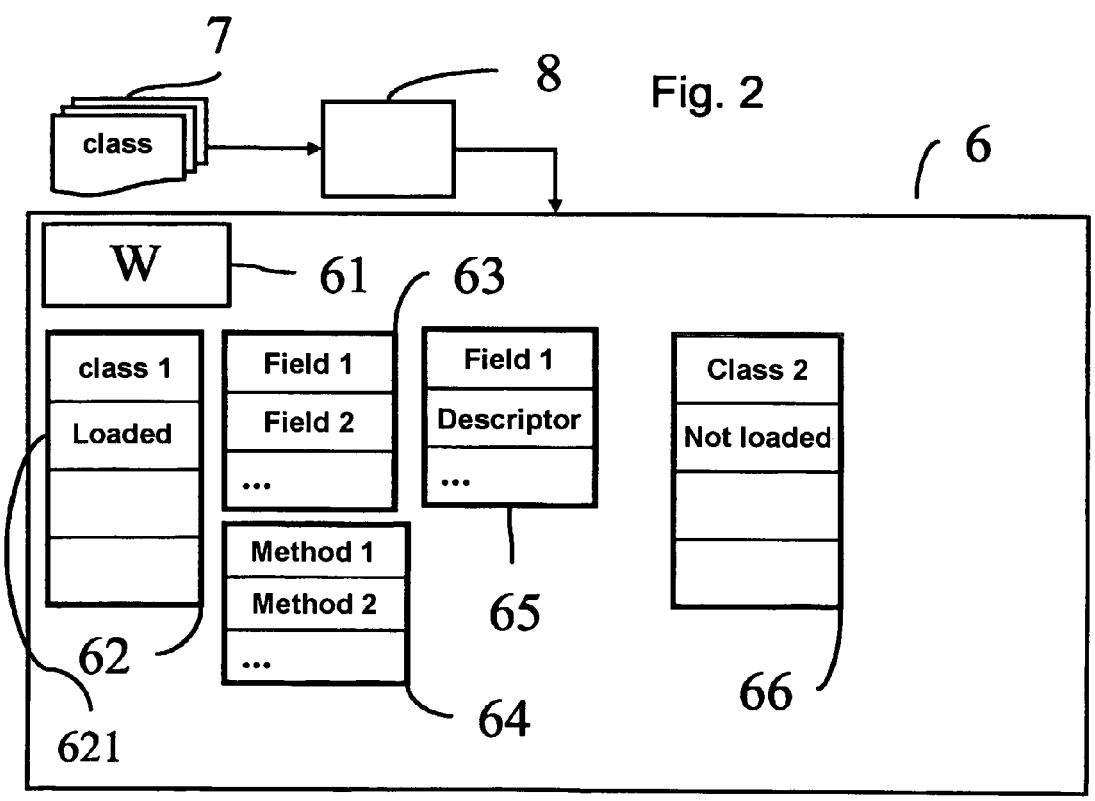
FIG. 2 shows the data stored in the non-volatile memory of the chip card during loading.

FIG. 2 shows the data stored in the memory 6 of the chip card 5 while the modules 7 are being loaded by a loader 8. The loader 8 is an application which is, for example, stored in the read-only memory of the chip card 5. The loader 8 accesses a first module to be loaded named Class1. The loader 8 places all or part of Class1 into working memory 61.

Figure 3:
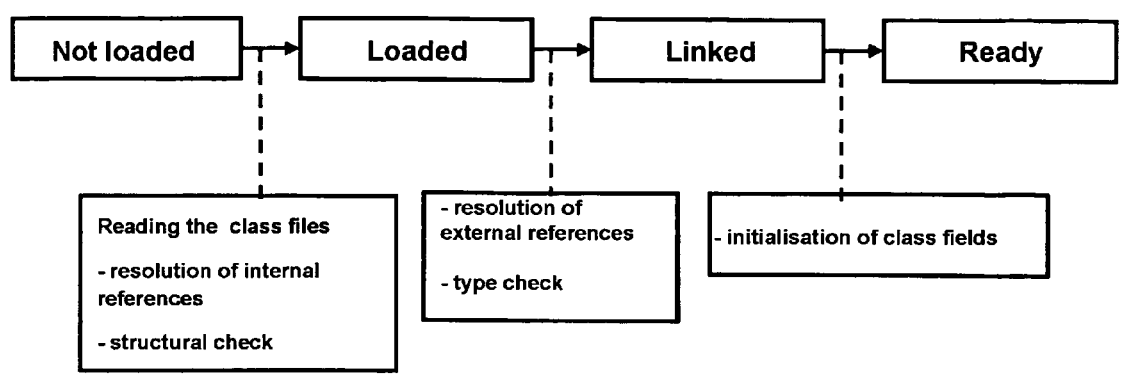
FIG. 3 shows the evolution of the state of a data structure marker in relation to the steps performed during loading.

The loader performs a preliminary check to see if the .class file is available (the .class file of a class to be dynamically loaded can for example be associated with a URL address). The loader also checks for the existence of a data structure 61 associated with Class1 in the non-volatile memory. Indeed, according to the loading method of the invention, this data structure may have been created beforehand while loading another module. If the data structure 62 associated with Class1 does not exist, this data structure is created in the non-volatile memory of the card 5. The structure 62 comprises a loading state marker 621. The marker 621 is placed in the "not loaded" state when the data structure is created. Different marker states and the steps that separate them are shown in FIG. 3.

When the loader 8 ascertains that the data structure 62 exists and is in the "not loaded" state, the loader resolves the links for all the internal elements for which references are found in Class1. The loader then deletes the parameters which are not needed for the execution of the program or the Class1 module (for example the line numbering table, the source file, the debugging information, etc.). The space taken up by the stored data in the non-volatile memory of the card is thus significantly reduced.

It is possible to contemplate only creating one data structure per module, and including all the data of the internal elements of this module in its associated data structure. A data structure is advantageously created in the non-volatile memory for each element referenced in a module to be loaded. The data structures can therefore be handled faster and easier, in particular such as to allow the deletion of a referenced element that is no longer needed following link editing or an optimisation.

Internal link resolution implies, in the example, the creation of data structures 63, 64 and 65 that can be handled by the virtual machine. These data structures are either created during the previous loading of another module (during external link resolution explained in detail below), or by the loader 8 having determined that they do not exist during this internal link resolution. The data structures 63 and 64 are tables that respectively list the internal fields and the methods whose references appear in Class1. The data structure 65 corresponds to the descriptor of a field listed in the data structure 63. In this way, it is possible to associate a data structure with each internal element or each list of internal elements.

The data structures are completed as the elements that concern them are actually loaded. Such loading therefore makes it possible only to store the elements that are required for execution in these data structures, automatically deleting the redundancies of the elements referenced from several other elements.

Once this link resolution has been performed, the marker 621 is placed in the "loaded" state. This link resolution step is advantageously used for performing the debugging of the module. Therefore, this link editing step will make it possible easily to determine the internal links that might turn out to be faulty.

A certain amount of data can be deleted following loading, in order to take up the minimum possible space in the non-volatile memory of the device. It is noted, in particular, that the .class file reference tables contain many entries that are only used during the process of loading the modules and not during the execution. Thus, the meta-information used when editing the link can be deleted. Certain method descriptors can also be deleted once the link editing has been performed for a .class file. It is, for example, possible to delete the textual description of the private internal modules of the module once the internal link editing has been performed: this description is only useful for editing this link and will not be used ever again.

In addition, it is possible to delete the description of certain public internal elements (intended to be read by other modules) if it is expected that no other module will be able to reference them. This is the case mainly when all subsequent loading of modules is prohibited in order to freeze the portable device. The device can be frozen mainly by invalidating the loader 8 or by deleting the code of the loader 8 if the latter is stored in the non-volatile memory.

Following the step of internal link resolution, the loader 8 performs a resolution of links for the external elements referenced in the Class1 module being loaded. Thus, for each external module referenced in Class1, the existence of an associated data structure is checked. If this is not the case, an associated data structure is created and its marker is placed in the "not loaded" state. In the example, Class1 refers to the external module Class2. Since no data structure exists for Class2 prior to loading Class1, the step of external link resolution for Class1 implies the creation of the data structure 66.

If a data structure must be created for every element in a module, every reference to an external element in the module being loaded must be resolved. In a similar fashion, a data structure is created for each external element if a test determines that the associated data structure no longer exists.

During the resolution of links for the external elements, the existence test advantageously includes a test of the conformity between the found data structure and its reference in the module currently being loaded. If this conformity test is negative, a load failure message is generated. This conformity test supplies additional debugging means.

In this way, the loading of a module makes it possible to create, as soon as possible, data structures for other modules to be loaded, in the non-volatile memory of the portable device. In addition, the markers make it possible to resume loading at the point where this loading might have been interrupted. Such loading makes it possible to load only certain modules, before the associated modules are available. The invention therefore makes it possible to modify the data structures of the modules dynamically as they are being loaded.

When the links of all the external references of the module to be loaded have been resolved, the marker of its data structure is place in "linked" state.

Then, the static data of this linked module are initialised. The marker of its data structure is then placed in the "ready" state. This module is then in the non-volatile memory of the portable device and is ready to be used. A code stored in the portable device and intended to initialise the static data is deleted when the data structure is in the "ready" state in order to reduce the memory space taken up. When the marker of the data structure is placed in "ready" state, the elements of the module placed in the working memory can be deleted in order to free up space in the digital device.

Those skilled in the trade will know how to define a suitable loading sequence of the successive modules of a compiled program. The loader 8 can, in particular, store the non-loaded modules for which data structures have been created, and then successively load them. The loader 8 is also capable of only loading the modules submitted to it.

If a module to be loaded is unavailable, the loader can also check repeatedly for availability and automatically load this module as soon as possible.

Due to the non-volatile memory space freed up, a standard Java Virtual Machine capable of loading .class files can be stored in the chip card. A developer can then distribute the same program for portable devices and for desktop computers. The developer will also have access to the library elements of his/her choice. Unlike in Java Card programming, the developer does not need to previously recover ExportFile files.

The invention claimed is:

1. A method of loading software compiled into intermediate object oriented language and comprising several modules for loading into non-volatile memory of a portable digital device equipped with a virtual execution machine, in which said modules are loaded in a form that can be executed by an interpreter of said virtual machine, wherein the loading of at least one of said modules comprises the following steps:
   checking for the existence of a data structure associated with said module in the non-volatile memory;
   if this data structure does not exist, creating a data structure associated with said module in the non-volatile memory and marking this data structure as not loaded;
   resolving links for all internal elements of said module in said data structure and then marking the data structure as loaded;
   for every other module referenced in the module being loaded, checking for the existence of a data structure associated with said other module; and
   if there is no data structure associated with said other module, creating a data structure associated with said other module in the non-volatile memory and marking this data structure as not loaded.

2. The method according to claim 1, wherein the step of creating the data structure associated with the module to be loaded comprises the step of storing in this data structure a descriptor of the module to be loaded.

3. The method according to claim 1,
   wherein the link resolution step comprises:
   verifying the existence of a data structure associated with each internal element;
   if said data structure does not exist, creating a data structure associated with an internal element in the non-volatile memory;
   for each external element mentioned in the module being loaded:
   verifying the existence of a data structure associated with this external element;
   if said data structure does not exist, creating a data structure associated with an external element in the non-volatile memory.

4. The method according to claim 1, wherein the loading of said module also comprises, after the link resolution, marking said module as linked if all external modules it mentions are marked as loaded.

5. The method according to claim 4, wherein:
   a check for the existence of a data structure comprises a conformity test between said data structure, if it exists, and its reference in the module being loaded, and the storage of conformity check information; and
   deleting the conformity check information of the references when the module is marked as linked.

6. The method according to claim 4, further comprising the following steps:
   initialising the static data of the module marked as linked; and
   marking said module as ready for use.

7. The method according to claim 6, wherein code stored in the digital device and intended to initialise static data is deleted once the module is marked as ready for use.

8. The method according to claim 1, wherein the modules to be loaded are compiled Java .class files.

9. The method according claim 8, wherein the data structures are data structures that can be handled by the virtual machine.

10. The method according to claim 8, wherein the digital device is a chip card with an embedded Java or DotNet virtual machine.

11. The method according to claim 1, wherein said module loading is carried out for all the program modules.

12. The method according to claim 1, wherein, following the unavailability of a module, the availability of said module is checked and the module is automatically loaded by the portable device.

13. A loader for a program compiled into an intermediate object oriented language comprising several modules to be loaded in a portable digital device, said loader being stored in the non-volatile memory of the device, said loader accessing modules stored on a source device and executing the following steps in the process of loading the program:
   checking for the existence of a data structure associated with a module in the non-volatile memory;
   if this data structure does not exist, creating a data structure associated with said module in the non-volatile memory and marking this data structure as not loaded;
   resolving links for all internal elements of said module in said data structure and then marking the data structure as loaded;
   for every other module referenced in the module being loaded, checking for the existence of a data structure associated with said other module; and
   if there is no data structure associated with said other module, creating a data structure associated with said other module in the non-volatile memory and marking this data structure as not loaded.

14. A program loaded in a portable device by the method of claim 1.

15. A portable digital device comprising non-volatile memory that stores the loader of claim 14.

16. The device according to claim 15, wherein the non-volatile memory also stores a program loaded by said loader.

17. The device according to claim 16, wherein the device is a chip card.

18. The device according to claim 15, wherein the device is a chip card.

* * * * *